Sept. 9, 1958 E. F. W. ALEXANDERSON 2,851,647
METHODS AND SYSTEMS FOR MOTOR CONTROL
Filed July 1, 1954
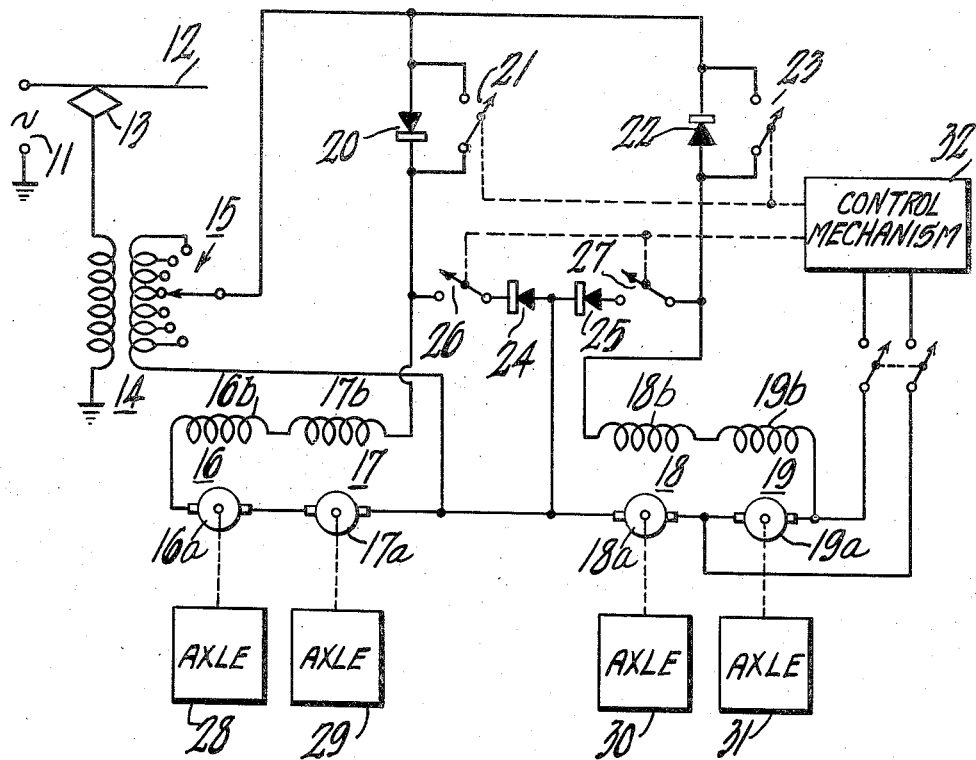
INVENTOR.
ERNST F. W. ALEXANDERSON
BY
ATTORNEY

United States Patent Office 2,851,647
Patented Sept. 9, 1958

2,851,647

METHODS AND SYSTEMS FOR MOTOR CONTROL

Ernst F. W. Alexanderson, Schenectady, N. Y.

Application July 1, 1954, Serial No. 440,623

13 Claims. (Cl. 318—248)

The present invention relates to a motor power circuit and is particularly applicable to motors of the type used in alternating current powered locomotives.

The alternating current system of railroad electrification has won out in competition both in the United States and in Europe. The controlling factors are the advantages of alternating current power distribution and the high horsepower that can be concentrated in one locomotive unit. The weakness of the alternating current system is that the alternating current motor develops insufficient torque at standstill and at very low speeds.

The compromises that have been adopted to overcome this weakness have never been adequate. The best compromise is perhaps the European one of adopting a very low frequency, 16⅔ cycles per second. In the United States the compromises have led to locomotive designs with two motors per driving axle, large driving wheels and the extra weight carried on leading and trailing trucks. The result is that the full locomotive weight is not available for starting a train, and though an abundance of horsepower is available, this power cannot be fully utilized when operating correspondingly heavy trains, particularly freight trains.

The ideal locomotive would be one powered by alternating current with one motor per axle and all axles driving, as is the practice in diesel-generator locomotives with direct current motors. Such a locomotive would have no limitation in weight of train except the total weight of the locomotive. It would furthermore not be limited in horsepower as the diesel locomotive is limited by the power of the diesel engine.

It is an object of the present invention to provide an improved method and power source for controlling alternating current powered machinery.

It is a further object of the present invention to provide an improved method and motor arrangement which has the advantages of direct current operation including extremely high starting torque and also the advantages outlined above of alternating current operation.

It is still another object of the present invention to utilize the advantageous characteristics of semi-conductor diodes to provide an improved power circuit for a motor having an armature and field winding connected in series.

The foregoing and other objects and advantages may be accomplished in accordance with the invention wherein means are provided for applying rectified alternating current pulses to one or more series-winding A.-C. motors for providing a high starting torque. After the motor or motors have attained a predetermined speed, the rectified current supply is changed to an alternating current supply.

In a preferred embodiment of the invention the rectified current is obtained by means of a series-connected half-wave germanium diode rectified. A second germanium diode is connected in shunt across the series-connected field winding and armature of the motor in order to prevent the field winding from inducing alternating current voltage in the armature during motor operation at standstill and at very low speeds. This is the induction which would normally cause damage to the armature.

At slow and intermediate speeds the shunt diode is disconnected from the circuit. After a predetermined higher speed is attained, the germanium diode in series with the alternating current source is by-passed or short-circuited and the motor is operated as a normal alternating current motor.

The invention will be described in greater detail by reference to the following description taken in connection with the accompanying drawing which is a schematic diagram of a typical system according to the present invention.

Referring to the drawing, a source 11 of alternating power for an electric railway system has one terminal grounded and the second terminal feeds an overhead line 12. A trolley 13 engages the overhead line and applies power to the primary winding of a transformer 14. The secondary winding 15 of the transformer is tapped in the conventional fashion to permit gradual build up of the voltage applied to the motors. The transformer 14 powers four motors 16–19, respectively, the motors consisting of armatures 16a–19a, respectively, and field windings 16b–19b, respectively. The four motors are split up into two groups, each including a pair of field windings in series connected to a pair of armatures which are also in series. The two groups are fed in parallel from the transformer 14.

In accordance with the present invention, there is connected in series with each group of motors a series germanium or other semi-conductor diode 20, 22, respectively. Switches 21, 23 are connected across the series diodes and provide shunting means therefor. Each group of motors is also provided with a shunt germanium diode 24, 25, respectively, and switches 26, 27 are connected in series with the shunt diodes for opening the shunt diode circuits.

In a preferred embodiment of the present invention axles 28–31 are driven by separate motors. Thus, more efficient distribution of the driving equipment is possible in view of the high starting torque developed by each motor.

In operation, the motors are operated in three different modes. In the first mode during which the motors are at standstill or operated at very slow speeds, there is pure D.-C. motor operation. In the second mode which is utilized for low and intermediate speeds, there is mixed D.-C. and A.-C. operation. The third and last mode is the normal alternating current mode of operation and is utilized from low or intermediate speed operation to full speed operation.

In the first mode of operation switches 21 and 23 are opened and switches 26 and 27 are closed. Germanium diodes 20 and 22 which are oppositely connected, act as half-wave rectifiers. During one half wave of input alternating current power, rectified current is supplied to the field windings and armatures of motors 16 and 17; during the other half wave of input alternating current power, rectified current is supplied to the field windings and armatures of motors 18 and 19. As is well known, when a motor armature is at rest or moves very slowly, its counter electromotive force is practically zero. The energy stored in the field windings of the motors during the rectified pulses of current therethrough would therefore ordinarily have the tendency to induce in the armatures harmful alternating current voltages of extremely large amplitude. This tendency is counteracted by the shunt germanium diodes 24 and 25 which provide a means for damping out this energy by shunting the armatures and field windings. In this first mode therefore the motors operate as direct current motors and the starting torgue is very high.

In the second mode of operation switches 21 and 23 remain open and switches 26 and 27 are also moved to their open position. There is therefore now mixed direct current and alternating current operation of the motors. The motors have now attained a low to intermediate speed and there is built up in the armatures a counter electromotive force the amplitude of which is a function of the speed of the motor. The motor fields are saturated by the direct current component and the alternating current induction from field winding to armature is reduced approximately one half.

In the third mode of operation switches 21 and 23 are closed and switches 26 and 27 are maintained in the open position. In this mode all diodes are effectively out of circuit and the motors operate as normal alternating current motors.

The use of germanium diodes has important advantages in that the weight of the diodes is only about 10–15% of the weight which would be required for other types of rectifiers having comparable operating characteristics. Such rectifiers are described in brief in an article on page 78 of the January 1954 issue of Electronics. Therein, it is mentioned that commercially available germanium power rectifiers are operable at current densities of 75 amperes per square centimeter of cell area. This is more than 1000 times the comparable figure for selenium rectifiers. Furthermore, the germanium diode is expected to provide substantially trouble-free operation. The use of germanium diodes permits the construction of alternating current locomotives with all weight on drivers, greater service capacity and lower maintenance.

In the embodiment of the invention illustrated the various switches are shown as being manually controllable. It is to be understood that the operation of these switches may be made automatic. In a preferred embodiment, the switches may be electrically actuated by the armatures of the motors. In one such method the back electromotive force developed across the armatures, the amplitude of which is a function of the rotational speed of the armature, may be used to energize a control mechanism 32 such as a solenoid or motor for opening switches 26 and 27 after the armatures have attained a first speed and for then closing switches 21 and 23 after the armatures have attained a second and higher speed. In another embodiment of the invention the switches may be either mechanically or electrically connected to the movable arm engaging the secondary winding 15 of power transformer 14. In such case, the shunt and series germanium diodes would be successively actuated in accordance with the alternating current power applied to the motors or the position of the movable arm connected to secondary winding 15, said position, of course, being a function of the power applied to the motors.

Although in the discussion above the use of the circuit of the present invention has been related to the powering of locomotives, it should be understood that the invention is not limited to such operation. The present system is very useful in any arrangement wherein it is desired to obtain the advantages of D.-C. operation including high starting torque during the initial operation of a motor and the advantages of alternating current performance during the intermediate to full speed operation thereof. Some uses for the system, for example, are for powering heavy machine tools, steel mill operations, etc. Moreover, it should be appreciated that the advantages of the present invention may also be important in cases where motors of smaller size are employed. In such cases it is possible very often substantially to decrease the size of the alternating current motor without adversely affecting and in fact improving the starting torque of the motor. Finally, it is to be understood that although in the description above four separate motors are employed, the invention is equally applicable to the operation of a single motor or any number of motors either more than or less than four.

What is claimed is:

1. A power circuit for an alternating current driven locomotive having at least four driving axles comprising, in combination, four motors, each mechanically connected to a different driving axle for driving said axles, each of said motors having an armature and a field winding, the first of said armatures being connected in series with the second of said armatures, the field winding of said second armature and the field winding of said first armature to provide a first series circuit, and the third of said armatures being connected in series with the fourth of said armatures, the field winding of said third armature and the field winding of said fourth armature to provide a second series circuit; a source of alternating current power; a pair of germanium diodes, one connected in series with each of the aforesaid series circuits, said first series circuit and its rectifier forming a first branch circuit, and said second series circuit and its rectifier forming a second branch circuit, said two branch circuits being connected in parallel across said source of power in such sense that said rectifiers pass rectified current pulses through said branches in opposite directions, a switch connected in shunt across each of said rectifiers for shunting said rectifiers when said armatures attain a predetermined speed; and damping means connected to the respective branch circuits for preventing said field windings from inducing alternating current voltages in said armatures during the respective periods between the application of rectified current pulses to the respective branch circuits.

2. A power circuit for an alternating current driven locomotive as set forth in claim 1, wherein said damping means comprises means for shunting the field windings of said motors to their corresponding armatures during said respective periods between the application of rectified current pulses to the respective branch circuits in which said motors are located.

3. A power circuit for an alternating current driven locomotive as set forth in claim 2, wherein said damping means comprises a second pair of germanium diodes, one connected in each branch circuit, and switch means in circuit with said last-named diodes for disconnecting said diodes when said armatures attain another predetermined speed.

4. A method of operating a motor having an armature and field winding connected in series comprising the steps of applying pulsating direct current to said motor when starting the same so as to develop high starting torque, damping the energy built up in said field winding during the application to said motor of said pulsating direct current for preventing said field winding from inducing alternating current voltage in said armature during the periods between the application of current pulses to said motor, and, after said armature has attained a predetermined speed, stopping the damping of the aforesaid energy built up in said field winding.

5. A method of operating a motor having an armature and field winding connected in series comprising the steps of applying pulsating direct current to said motor when starting the same so as to develop high starting torque; damping the energy built up in said field winding during the application to said motor of said pulsating direct current for preventing said field winding from inducing alternating current voltage in said armature during the periods between the application of current pulses to said motor; after said armature has attained a first predetermined speed, stopping the damping of said energy; and, after said armature has attained a second predetermined speed, stopping the application of said pulsating direct current to said motor and applying instead alternating current to said motor.

6. In a motor control circuit for a motor having an armature and field winding connected in series, in combination, rectifier means for converting alternating current to pulsating direct current connected in series with said armature and field winding; connections for a source of alternating current power connected across the series circuit of said rectifier means, armature and field winding, whereby, when said source is in circuit, pulsating direct current is applied through said rectifier means to said motor; damping means having a low impedance for one direction of current flow and a high impedance for the opposite direction of current flow in circuit with said motor for damping alternating current discharge of the energy built up in the field winding thereof through said armature thereof; and means in circuit with said damping means for disconnecting the same after the motor has attained a predetermined speed.

7. In a motor control circuit as set forth in claim 6, further including shunting means connected to said rectifier means for shunting the latter after said motor has attained a second, higher predetermined speed.

8. In a motor control circuit for a motor having an armature and field winding connected in series, in combination, rectifier means for converting alternating current to pulsating direct current connected in series with said armature and field winding; connections for a source of alternating current power connected across the series circuit of said rectifier means, armature and field winding, whereby, when said source is in circuit, pulsating direct current is applied through said rectifier means to said motor; damping means including a unidirectionally conducting element in circuit with the field winding and armature of said motor for damping alternating current discharge of the energy built up in said field winding through said armature; and means in circuit with said damping means for disconnecting the same after said motor has attained a predetermined speed.

9. In a motor control circuit for a motor having an armature and field winding connected in series, in combination, rectifier means for converting alternating current to pulsating direct current connected in series with said armature and field winding; connections for a source of alternating current power connected across the series circuit of said rectifier means, armature and field winding, whereby, when said source is in circuit, pulsating direct current is applied through said rectifier means to said motor; damping means having a low impedance for one direction of current flow and a high impedance for the opposite direction of current flow connected in shunt across the series circuit of said field winding and armature, said one direction of current flow being the same as the direction of flow of said pulsating direct current; and means in circuit with said damping means for disconnecting the same after said motor has attained a predetermined speed.

10. In a motor control circuit for a motor having an armature and field winding connected in series, in combination, rectifier means of the type adapted to convert alternating current to pulsating direct current connected in series with said rectifier means, armature and field winding, whereby, when said source is in circuit, pulsating direct current is applied through said rectifier means to said motor; damping means including rectifier means in circuit with said field winding and armature for damping alternating current discharge of energy stored in said field winding through said armature; and a switch in series with the last-named rectifier means for disconnecting the latter after said motor attains a predetermined speed.

11. In a motor control circuit for a motor having an armature and field winding connected in series, in combination, rectifier means of the type adapted to convert alternating current to pulsating direct current connected in series with said armature and field winding; connections for a source of alternating current power connected across the series circuit of said rectifier means, armature and field winding, whereby, when said source is in circuit, pulsating direct current is applied through said rectifier means to said motor; half-wave rectifier means connected in shunt across the series circuit of said armature and field winding, said last-named rectifier means being connected to conduct current through said armature in the same direction as that of the flow of said pulsating direct current therethrough; and a switch in series with said last-named rectifier means for disconnecting the latter after said motor attains a predetermined speed.

12. In a motor control circuit for a motor having an armature and field winding connected in series, in combination, rectifier means of the type adapted to convert alternating current to pulsating direct current connected in series with said armature and field winding; connections for a source of alternating current power connected across the series connection of said rectifier means, armature and field winding, whereby, when said source is in circuit, pulsating direct current is applied through said rectifier means to said motor; damping means comprising rectifier means operatively associated with said motor for damping alternating current discharge of energy stored in the field winding thereof through the armature thereof; means operatively associated with said damping means for disconnecting the latter after said motor has attained a first predetermined speed; and shunting means operatively associated with the first-named rectifier means for shunting the latter when said motor has attained a second, higher predetermined speed.

13. In a motor control circuit as set forth in claim 12, said damping means comprising a germanium diode and said first-named rectifier means comprising a germanium diode.

References Cited in the file of this patent

UNITED STATES PATENTS

| 1,563,004 | Alexanderson | Nov. 24, 1925 |
| 2,546,014 | Pucholwski et al. | Mar. 20, 1951 |
| 2,679,624 | Widell et al. | May 25, 1954 |

FOREIGN PATENTS

| 432,203 | Great Britain | July 22, 1935 |